(12) United States Patent
Wray

(10) Patent No.: US 7,600,261 B2
(45) Date of Patent: Oct. 6, 2009

(54) SECURITY ATTRIBUTES IN TRUSTED COMPUTING SYSTEMS

(75) Inventor: Michael John Wray, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 716 days.

(21) Appl. No.: 10/810,308

(22) Filed: Mar. 26, 2004

(65) Prior Publication Data

US 2005/0028003 A1 Feb. 3, 2005

(30) Foreign Application Priority Data

Mar. 28, 2003 (GB) ................... 0307142.0

(51) Int. Cl.
*H04L 9/00* (2006.01)
(52) U.S. Cl. .............. 726/26; 713/2; 713/164; 713/166; 713/193; 713/194; 718/100; 718/104; 708/135
(58) Field of Classification Search ............ 726/1, 726/189–194, 26
See application file for complete search history.

(56) References Cited

U.S. PATENT DOCUMENTS

| | | | |
|---|---|---|---|
| 5,825,877 A | 10/1998 | Dan et al. | |
| 5,915,085 A | 6/1999 | Koved | 395/186 |
| 6,389,534 B1* | 5/2002 | Elgamal et al. | 713/164 |
| 6,430,561 B1 | 8/2002 | Austel et al. | 707/9 |
| 7,013,390 B1* | 3/2006 | Elgamal et al. | 713/164 |
| 7,073,059 B2* | 7/2006 | Worely et al. | 713/168 |
| 7,216,369 B2* | 5/2007 | Wiseman et al. | 726/34 |
| 7,272,832 B2* | 9/2007 | Gardner | 718/105 |
| 7,302,698 B1* | 11/2007 | Proudler et al. | 726/2 |
| 7,448,079 B2* | 11/2008 | Tremain | 726/14 |
| 2002/0077803 A1 | 6/2002 | Kudoh et al. | 704/1 |
| 2002/0089528 A1* | 7/2002 | Hay et al. | 345/712 |
| 2002/0174369 A1* | 11/2002 | Miyazaki et al. | 713/202 |
| 2002/0194241 A1* | 12/2002 | Griffin et al. | 709/1 |
| 2003/0149895 A1 | 8/2003 | Choo et al. | |
| 2003/0188179 A1* | 10/2003 | Challener et al. | 713/193 |
| 2004/0064457 A1* | 4/2004 | Zimmer et al. | 707/100 |

FOREIGN PATENT DOCUMENTS

| | | |
|---|---|---|
| GB | 2 376 764 | 12/2002 |
| GB | 2 379 764 | 3/2003 |
| JP | 10-083310 | 3/1998 |
| JP | 2004-535611 A | 11/2004 |
| WO | 00/48063 | 8/2000 |
| WO | 00/54125 | 9/2000 |
| WO | 02061552 A1 | 8/2002 |

OTHER PUBLICATIONS

Grawrock, David. "TCPA Main Specification 1.1b." Feb. 22, 2002. pp. 1-23.*

(Continued)

*Primary Examiner*—Edan Orgad
*Assistant Examiner*—Ronald Baum

(57) ABSTRACT

A system comprising a trusted computing platform including one or more logically protected computing environments, each of which is associated with at least one service or process supported by said system, the system being arranged to load onto said trusted computing platform a predetermined security policy including one or more security rules for controlling the operation of each of said logically protected computing environments, the security rules for at least one of said logically protected computing environments including an execution control rule which defines the security attributes to be applied to a service or process associated with said logically protected computing environment when said service or process is started.

15 Claims, 2 Drawing Sheets

OTHER PUBLICATIONS

Bajikar, Sundeep. "Trusted Platform Module (TPM) based security on Notebook PCs—White Paper." Jun. 20, 2002. Mobile Platforms Group, Intel Corporations. 20 pages. Retrieved from http://www.intel.com/design/mobile/platform/downloads/Trusted_Platform_Mobile_White_Paper.pdf.*

Lie, D., et al, 'Implementing an Untrusted Operating System on Trusted Hardware', Copyright 2003, ACM 1-58113-757-5/03/0010, entire document, http://www.cs.rochester.edu/meetings/sosp2003/papers/p134-lie.pdf.*

U.S. Appl. No. 10/810,348, filed Mar. 26, 2004, Wray.

Dalton, C.I., et al., "Applying Military Grade Security to the Internet," *Computer Networks and ISND Systems*, vol. 29, pp. 1799-1808 (1997).

"Trusted Computing Platform Alliance (TCPA), TCPA Design Philosophies and Concepts," Version 1.0, Internet: <http://www.trustedpc.org> pp. 1-30 (Jan. 2001).

* cited by examiner

SECURITY ATTRIBUTES IN TRUSTED COMPUTING SYSTEMS

FIELD OF THE INVENTION

This invention relates generally to the security policy employed in trusted computing systems and, more particularly, to a method and apparatus for defining security attributes in respect of permitted access to system resources.

BACKGROUND TO THE INVENTION

For commercial applications, a client computing platform typically operates in an environment where its behaviour is vulnerable to modification by local or remote entities. This potential insecurity of the platform is a limitation on its use by local parties who might otherwise be willing to use the platform, or remote parties who might otherwise communicate with the platform; for example, for the purposes of E-commerce.

In the applicant's co-pending disclosure WO 00/48063, incorporated herein by reference, there is disclosed the concept of a 'trusted computing platform' comprising a computing platform which has a 'trusted component' in the form of a built-in hardware and software component. This document describes the use of a Trusted Device (TD) or Trusted Platform Module (TPM) to enable verification of the integrity of computing apparatus by the reliable measurement and reporting of integrity metrics. A TD/TPM conforms to the Trusted Computing Platform Alliance (TCPA) specification.

A Trusted Device or Trusted Platform Module may include one or more logically protected computing environments or "compartments" within which a service or process may be run. The actions or privileges within a compartment are constrained, particularly to restrict the ability of a process to execute methods and operations which have effect outside the compartment, such as methods that request network access or access to files outside of the compartment. Also, operation of a process or service within a compartment is performed with a high level of isolation from interference and prying by outside influences. The or each compartment may be an operating system compartment controlled by an operating system kernel. This is also referred to as a compartmented operating system or a trusted operating system.

Trusted operating systems have been available for several years in a form designed for handling and processing classified (military) information, using a containment mechanism enforced by a kernel of the operating system with mandatory access controls to resources of the computing platform such as files, processes and network connections. The operating system attaches labels to the resources and enforces a security policy which governs the allowed interaction between these resources based on their label values. Many trusted operating systems apply a security policy based on the Bell-Lapadula model discussed in the paper "Applying Military Grade Security to the Internet" by C I Dalton and J F Griffin published in Computer Networks and ISDN Systems 29 (1997) 1799-1808.

In any event, many trusted computing platforms adopt a relatively simple and convenient form of operating system compartment. As a general rule, each resource of the computing platform which it is desired to protect is given a label indicating the compartment to which that resource belongs. Mandatory access controls, incorporating a security policy, are performed by the kernel of the host operating system to ensure that resources from one compartment cannot interfere with resources from another compartment. In a secure system, access to system resources is defined by security or subject attributes.

The above-mentioned security policy tends to be expressed in the form of security rules (each generally comprising an instruction line defining security attributes). In general, one or more security rules are associated with a compartment, and each compartment may be associated with one or more services.

In the past, it has been considered desirable to load the security rules as early in the startup sequence of a platform as possible, such that relevant security rules are in force as soon as a service or process is started. As such, in prior art systems, all security rules tend to be loaded to the platform at the time of system initialisation, i.e. a complete security policy is loaded at system startup. Thus, security attributes tend to be assigned by security initialisation and cannot be changed except by processes with special authorisation.

In secure operating systems, there is often a need to change the security attributes of programs at certain points (i.e. perform a 'security transition'), for example, when when a process forks and runs another program, because a service requires a security ID to enter a compartment. Thus, in prior art systems, it has either been necessary to modify the manner in which a service starts (i.e. modify the script, control program or other facility by which the service starts) so as to ensure that it is put in the correct compartment, or some form of mapping function has been configured to handle this issue.

In other words, the changing of security attributes of programs at certain points has, in the past, been done explicitly, using special system calls, or by using trusted gateway programs to change the attributes. This is inconvenient because it involves modifying the calling program (as mentioned above) to include the special system calls or to call the trusted gateway program instead of the required program. It can also involve making it necessary to give the calling program extra security attributes allowing it to change the attributes of called programs.

DISCLOSURE OF THE INVENTION

In accordance with the present invention, there is provided a system comprising a trusted computing platform and one or more logically protected computing environments, each of which is associated with at least one service or process supported by said system, the system being arranged to load onto said trusted computing platform data defining a predetermined security policy defining security attributes to be applied to one or more of the at least one service or process when said service or process is started.

In one embodiment the policy included one or more security rules for controlling operation of logically protected computing environments.

Preferably the or each security rule for at least one of the logically protected environments will include an execution control rule which defines the security attributes.

Also in accordance with the present invention, there is provided a method of applying a security policy in a system including a trusted computing platform and one or more logically protected computing environments, each of which is associated with at least one service or process supported by said system, the method including the step of:

Marking a service or process associated with at least one of the logically protected computing environments; and controlling the operation of the at least one logically protected environment by applying, upon starting of the service or process, security attributes to the service of process.

Preferably the attributes are defined by execution control rules, which are included in security rules complementing at least part of the policy.

It will be appreciated that, in the context of the present invention, the term "trust" is used in the sense that something can be "trusted" if it always behaves in the expected manner for the intended purpose.

Thus, the present invention provides the ability to include in the security rules for a logically protected computing environment (or "compartment") an execution control rule (hereinafter referred to as an "exec rule") which defines or modifies security attributes to be applied to a service or process when that service or process is started. This removes the need to modify existing programs or use security-trusted gateway programs.

The security attributes may include or comprise one or more capabilities to be provided to the respective logically protected computing environment when the service or process has started; one or more functions which change or modify the capabilities of the respective logically protected computing environment when the service or process is started; a function which, when a service or process is started, causes the service or process to be placed and run in a specified logically protected computing environment; a function which can modify a user id, a group id, or a logically protected computing environment in which a service or process is to be run; and/or a function defining a directory to which the respective service or process is to be chrooted. As will be understood by a person skilled in the art, the term "chroot" is a command to make the root directory (1) become something other than its default for the lifetime of the current process.

In the case where the security attributes include or comprise one or more functions which change or modify the capabilities of the respective logically protected computing environment when the process or service has started, such functions may raise or lower a specified capability. In one embodiment of the invention, means for filtering a set of capabilities may be provided such that only one or more of said capabilities as selected by the filtering means is modified.

The or each execution control rule preferably specifies the service or process to which it applies by identifying the associated logically protected computing environment, with the effect that the rule applies only to services and processes specifying that logically protected computing environment.

The files making up a service or process are preferably read-only, and means are preferably provided for monitoring operations performed by the system which modify the names of such files.

BRIEF DESCRIPTION OF THE DRAWINGS

An embodiment of the present invention will now be described by way of example only and with reference to the accompanying drawings, in which.

DETAILED DESCRIPTION OF THE INVENTION

In the following description, numerous specific details are set forth in order to provide a thorough understanding of the present invention. It will be apparent, however, to one skilled in the art, that the invention may be practised without limitation to these specific details. In other instances, well known methods and structures have not been described in detail so as to avoid unnecessarily obscuring the present invention.

A trusted computing platform of a type generally suitable for carrying out an embodiment of the present invention is described in detail in the applicant's International Patent Application No. PCT/GB00/00528 entitled 'Trusted Computing Platform' and filed on $15^{th}$ Feb. 2000, the contents of which are incorporated herein by reference. This document describes the essential elements of the construction of a trusted computing platform, and its role in providing integrity metrics indicating the state of the computing platform to a user of that platform, and communication of such metrics to a user.

Figure 1:
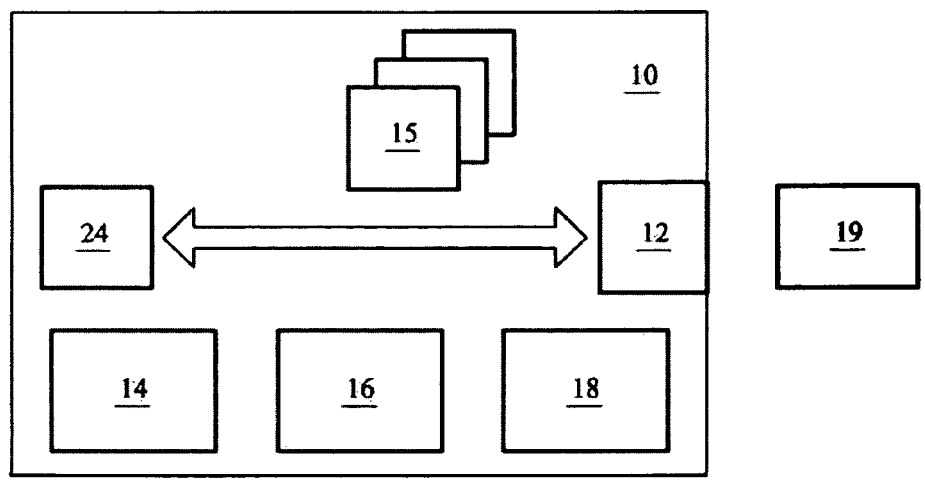
FIG. 1 is a diagram that illustrates a system capable of implementing embodiments of the present invention.

Briefly, and referring to FIG. 1 of the drawings, a trusted computing platform 10 includes the standard features of a keyboard 14, a mouse 16 and a visual display unit (VDU) 18, which provide the physical 'user interface' of the platform. This embodiment of a trusted platform also contains a smart card reader 12, although this is not essential in all embodiments of the present invention. Alongside the smart card reader 12, there is illustrated a smart card 19 to allow trusted user interaction with the trusted platform (this aspect is further described in the applicant's International Patent Application No. PCT/GB00/00751 entitled "Smartcard User Interface for Trusted Computing Platform" and filed on $3^{rd}$ Mar. 2000, the contents of which application are incorporated herein by reference). In the platform 10, there are a plurality of modules 15: these are other functional elements of the trusted platform of essentially any kind appropriate to that platform (the functional significance of such elements is not relevant to the present invention and will not be discussed further herein).

Figure 2:
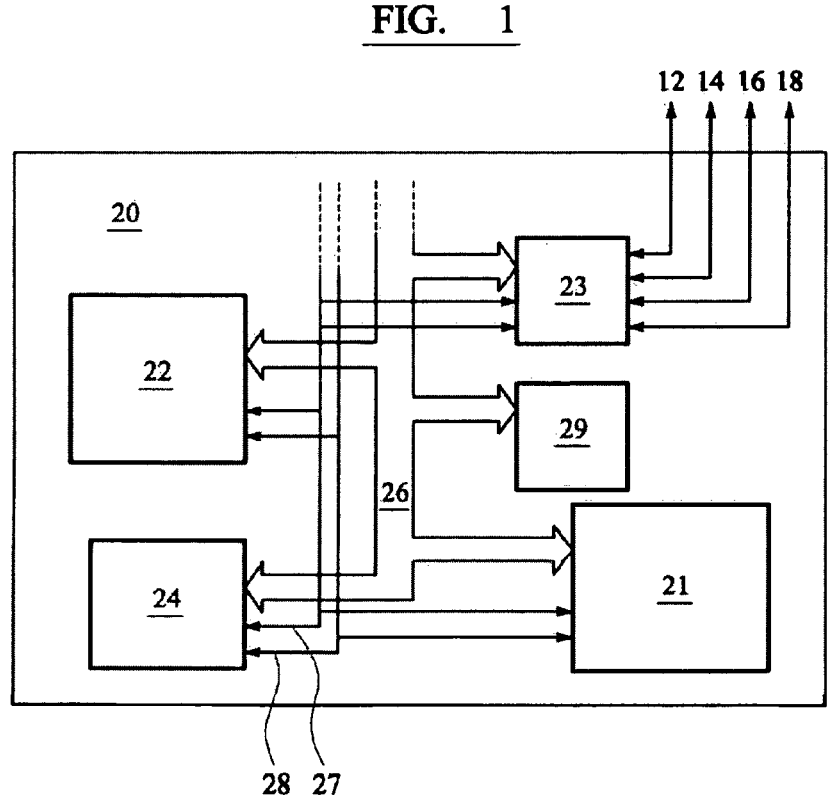
FIG. 2 is a motherboard including a trusted device arranged to communicate with a smart card reader and with a group of modules.

Referring to FIG. 2 of the drawings, the motherboard 20 of the trusted computing platform 10 includes (among other standard components) a main processor 21, main memory 22, a trusted device 24, a data bus 26 and respective control lines 27 and address lines 28, BIOS memory 29 containing the BIOS program (which, after reset, builds a proper environment within which the operating system program will be run) for the platform 10, and an input/output (I/O) devices 23, which controls interaction between the components of the motherboard and the smart card reader 12, the keyboard 14, the mouse 16 and the VDU 18. The main memory 22 is typically random access memory (RAM). In operation, the platform 10 loads the operating system into RAM from hard disk (not shown).

Thus, after reset, the main processor is initially controlled by the trusted device, which then hands control over to the platform-specific BIOS program, which in turn initialises all input/output devices as normal. After the BIOS program has executed, control is handed over to an operating system program, which is typically loaded into the main memory 22 from a hard disk drive (not shown). It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build a proper environment for the operating system.

The structure of the trusted device 24 is described in more detail in the applicant's above-mentioned International Patent Application No. PCT/GB00/00528. The specific structure of the trusted device is not relevant to the present invention and will not be discussed further herein.

A trusted computing platform, once started up, tends to have a compartmented or trusted operating system. This means that one or more services or processes required to be supported by the operating system are run within a compartment which is a logically protected computing environment. As stated above, the actions or privileges within a compartment are constrained (by the security policy), particularly to restrict the ability of a process to execute methods and operations which have effect outside the compartment, such as methods that request network access or access to files outside of the compartment. In addition, operation of the process within the compartment is performed with a high level of isolation from interference and prying by outside influences.

In a preferred embodiment, the compartment is an operating system compartment controlled by the operating system kernel and, as stated above, this is also referred to as a compartmented operating system or a trusted operating system.

Communication between compartments and network resources is provided via narrow kernel level controlled interfaces to a transport mechanism such as TCP/UDP. Access to these communication interfaces is governed by rules specified on a compartment by compartment basis. At appropriate points in the kernel, access control checks are performed such as through the use of hooks to a dynamically loadable security module that consults a table of rules indicating which compartments are allowed to access the resources of another compartment. In the absence of a rule explicitly allowing a cross compartment access to take place, an access attempt is denied by the kernel. The rules enforce mandatory segmentation across individual compartments, except for those compartments that have been explicitly allowed to access another compartment's resources.

Figure 3:
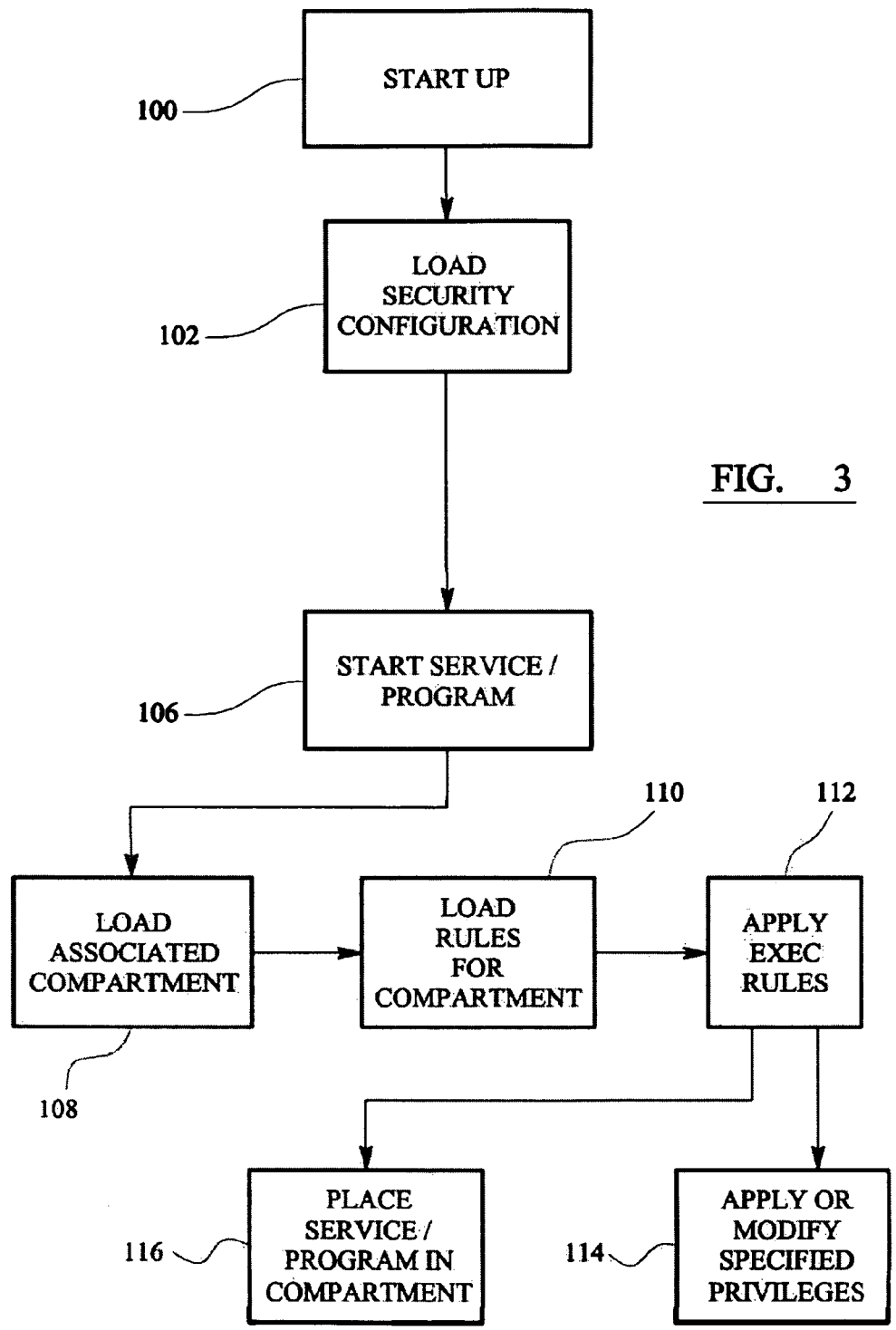
FIG. 3 is flow diagram illustrating a (simplified) method according to an exemplary embodiment of the present invention.

Referring to FIG. 3 of the drawings, an exemplary embodiment of a process according to the present invention begins at step 100, where startup of the platform is performed. At startup, a script is run to load a security module known as a pluggable authentication module (or PAM) and then two input files are loaded into memory, which two input files are the compartment name and number mappings and the network interface name and network interface number mappings respectively. The platform includes a directory containing a number of subdirectories, one for each compartment configured on the system and, at this point, the subdirectories associated with the compartments associated (only) with system initialisation are accessed, and another script is run which iterates through these subdirectories and loads the compartments associated with system initialisation, and the security rules associated with each loaded compartment.

At step 102, the security configuration is loaded.

At step 106, the system determines that a service is starting, and the compartment associated with that service is loaded (at step 108), together with the accompanying security rules (at step 110). Included in the security rules, there may be one or more exec rules, i.e. rules to be applied to a service or process after it has been executed, and these exec rules are applied at step 112.

Exec rules have two primary uses. Firstly, they can be used to define the security attributes a process is to have when it is started (step 114). As an example, consider the following exec rule:

```
exec[   from.comp system;
        filename /sbin/mingetty;
        comp system;
```

-continued

```
        permitted.raise   CAP_MAC_ADMIN
                          CAP_MAC_SETCID    ]
```

Thus, if the process identified by "filename/sbin/mingetty" is running in the "system" compartment, that compartment is given the privileges "CAP_MAC_ADMIN" and "CAP_MAC_SETCID", such that PAM can ensure that each user gets the correct privileges, i.e. this gives PAM the ability to give all users the required privileges. In more detail, a program is provided to control user logins, and a PAM module runs on login, setting user compartment and capabilities for the user's login. This is a privileged operation, so the program controlling user logins needs to have the defined capabilities (CAP_MAC_ADMIN and CAP_MAC_SETCID) so that they will be inherited by the process that runs PAM, and it will have the privilege to configure the login correctly.

Secondly, exec rules can be used to provide mappings to define where a process is to be run. Thus, for example, consider the case where service a is to be run in compartment A. When compartment A is opened or loaded, the rules associated with that compartment are also loaded. In those rules, there may be an exec rule which specifies that, when service a is started, run it in compartment A, which rule is then applied (at step 116). Thus, service a can be started in the conventional way (such that it does not need to be modified), and it is moved to the correct compartment the relevant exec rule which is loaded when compartment A is loaded. Each exec rule specifies the file(s) affected and the compartment the rule applies to, such that the use of exec rules avoids the need to use trusted gateways.

In summary, exec rules according to this exemplary embodiment of the present invention have control over the security-relevant properties of a process, including:

uid: resulting user id (unmodified if not specified)

gid: resulting group id (unmodified if not specified)

capabilities: capability modifiers for the effective, permitted and inheritable sets. (Capabilities may be raised, lowered or filtered. A raised capability is set on. A lowered capability is set off. Capabilities in the filtered set are unmodified, and capabilities not in the filtered set are lowered. Capability modifiers can be used to restrict various (sensitive) things which can otherwise be done from a system administration point-of view. Capability restrictions can be used to limit "root" powers to prevent unauthorised persons from obtaining these capabilities).

compartment: resulting compartment (unmodified if not specified)

chroot: a directory to chroot the process to (no chroot if not specified)

In the process described above, an exec rule specifies the processes it applies to by giving a compartment id. The rule only applies to processes with that compartment id. In this exemplary embodiment of the invention, an exec rule also contains a file path, which may be the name of a directory or individual file. If the file path is a directory it applies to all files in that directory and its subdirectories, unless another exec rule is "more specific". The concept of selection of the "more specific" rule when there is a rule conflict will be known to a person skilled in the art. Furthermore, the manner in which such rule conflicts may be resolved is of little relevance to the present invention and will not be discussed any further herein.

Further, symbolic links tend not to be followed in this exemplary embodiment of the invention when determining the set of files a rule applies to, unless the rule's path itself denotes a symbolic link.

It is preferred to make files having applicable exec rules read-only from all compartments, unless the caller has admin capability. This is because a file with an exec rule essentially has a privilege conferred on it and it would be undesirable for this privilege to be conferred on a modified file. In some cases, it may be possible for an unauthorised entity to change the rules applying to a file by creating a hard link to it. However, in this exemplary embodiment of the invention, the offending link would be caused to be removed and an error would be returned.

In order to maintain a correct view of which exec rules apply to which files, it is preferred to monitor operations modifying the file namespace, i.e. file create, file rename, link create, link delete, mount, unmount.

In summary, exec rules remove the need to modify existing programs or use trusted gateways, by directly specifying the security attributes of a process after calling another program. Exemplary apparatus suitable for carrying out the process of FIG. 3 may comprise may include filtering means for filtering a set of capabilities of a logically protected computing environment and modifying only one or more of those capabilities, as selected by the filtering means. Monitoring means may be provided for monitoring operations performed by the system which modify names of files making up services or programs to which an execution control rule applies.

An execution control rule may specify the service or process to which it applies by identifying the associated logically protected computing environment, with the effect that the rule applies only to the services or processes specifying that logically protected computing environment.

An embodiment of the present invention has been described by way of example only, and it will be apparent to persons skilled in the art that modifications and variations can be made to the described embodiment without departing from the scope of the invention as defined by the appended claims.

The invention claimed is:

1. A system comprising a trusted computing platform and one or more logically protected computing environments, each logically protected computing environment being an operating system compartment associated with at least one service or process supported by said system, the system being arranged to load an operating system into said trusted computing platform and thereafter to load onto said trusted computing platform data defining a predetermined security policy defining security attributes to be applied to one or more of the at least one service or process when said service or process is started.

2. A system according to claim 1 wherein the policy included one or more security rules for controlling operation of logically protected computing environments.

3. A system according to claim 2 wherein at least one of the one or more security rules is for at least one of the logically protected environments and includes an execution control rule which defines the security attributes.

4. A system according to claim 3, wherein said security attributes include or comprise one or more capabilities to be provided to the respective logically protected computing environment when said service or process is started.

5. A system according to claim 3, wherein said security attributes include or comprise one or more functions which change or modify the capabilities of the respective logically protected computing environment when said service or process is started.

6. A system according to claim 5, wherein said execution control rule can raise or lower a specified capability.

7. A system according to claim 5, wherein the security attributes operate to filter a set of capabilities of a logically protected computing environment and modifying only one or more of said capabilities as selected by said filtering means.

8. A system according to claim 3, wherein when a service or process is started said security attribute operates to cause the service or process to be placed and run in a specified logically protected computing environment.

9. A system according to claim 3, wherein said security attributes operate to modify a user id, a group id or a logically protected computing environment in which a service or process is to be run.

10. A system according to claim 3, wherein said security attributes operate to change the root directory of the service or process.

11. A system according to claim 3, wherein said execution control rule specifies the service or process to which it applies by identifying the associated logically protected computing environment, with the effect that said rule applies only to services or processes specifying that logically protected computing environment.

12. A system according to claim 3, wherein the files making up a service or process to which said execution control rule applies are of read-only configuration.

13. A system according to claim 3, including means for monitoring operations performed by the system which modify names of files making up services or programs to which said execution control rule applies.

14. A method of applying a security policy in a system including a trusted computing platform and one or more logically protected computing environments, each logically protected computing environment being an operating system compartment associated with at least one service or process supported by said system, the method including the steps of loading an operating system into said trusted computing platform; after loading the operating system, starting a service or process associated with at least one of the logically protected computing environments; and controlling the operation of the at least one logically protected environment by applying, upon starting of the service or process, security attributes to the service or process.

15. A method according to claim 14 wherein the attributes are defined by execution control rules, which are included in security rules implementing at least part of the policy.

* * * * *